(12) United States Patent
Milne et al.

(10) Patent No.: US 11,104,095 B2
(45) Date of Patent: Aug. 31, 2021

(54) CLAMP HAVING A CORE LAYER OF RIGID POLYURETHANE

(71) Applicant: Balmoral Comtec Limited, Aberdeen (GB)

(72) Inventors: Fraser Milne, Brechin Angus (GB); Aneel Gill, Monifieth Angus (GB); Ewan George Lawrence Reid, Banchory Aberdeenhire (GB)

(73) Assignee: Balmoral Comtec Limited, Aberdeen (GB)

( * ) Notice: Subject to any disclaimer, the term of this patent is extended or adjusted under 35 U.S.C. 154(b) by 0 days.

(21) Appl. No.: 16/638,050

(22) PCT Filed: Aug. 13, 2018

(86) PCT No.: PCT/GB2018/052294
§ 371 (c)(1),
(2) Date: Feb. 10, 2020

(87) PCT Pub. No.: WO2019/030541
PCT Pub. Date: Feb. 14, 2019

(65) Prior Publication Data
US 2020/0215805 A1    Jul. 9, 2020

(30) Foreign Application Priority Data

Aug. 11, 2017  (GB) ..................... 1712940

(51) Int. Cl.
*B32B 1/08*     (2006.01)
*F16L 3/08*     (2006.01)
(Continued)

(52) U.S. Cl.
CPC ............... *B32B 1/08* (2013.01); *B32B 5/022* (2013.01); *B32B 5/024* (2013.01); *B32B 7/022* (2019.01);
(Continued)

(58) Field of Classification Search
CPC .. B32B 1/02; B32B 1/08; B32B 5/022; B32B 5/024; B32B 7/022; B32B 15/088;
(Continued)

(56) References Cited

U.S. PATENT DOCUMENTS 6,368,702 B1 * 4/2002 Erickson ............... B29C 43/203
                                                    428/292.1
6,403,195 B1   6/2002 Montagna et al.

FOREIGN PATENT DOCUMENTS

CN    204197070     3/2015
GB    1277364       6/1972
(Continued)

OTHER PUBLICATIONS

PCT/GB2018/052294 International Preliminary Report on Patentability and Written Opinion of the International Searching Authority dated Feb. 11, 2020 (10 pages).
(Continued)

*Primary Examiner* — Walter Aughenbaugh
(74) *Attorney, Agent, or Firm* — SmithAmundsen LLC

(57) ABSTRACT

A creep resistant material comprises a core layer (12) of rigid polyurethane with a first tensile reinforcement layer (17) applied on one surface and a second tensile reinforcement layer (17) applied on the other opposed surface of the core layer, the entire respective first and second tensile reinforcement layers being in contact with the first and second surface of the core layer of the material.

22 Claims, 4 Drawing Sheets

(51) Int. Cl.
  *B32B 7/022* (2019.01)
  *B32B 5/02* (2006.01)
  *B32B 15/088* (2006.01)
  *B32B 15/095* (2006.01)
  *B32B 27/34* (2006.01)
  *B32B 27/40* (2006.01)
  *F16L 3/10* (2006.01)

(52) U.S. Cl.
  CPC .......... *B32B 15/088* (2013.01); *B32B 15/095* (2013.01); *B32B 27/34* (2013.01); *B32B 27/40* (2013.01); *F16L 3/08* (2013.01); *F16L 3/10* (2013.01); *F16L 3/1066* (2013.01); *B32B 2260/021* (2013.01); *B32B 2305/28* (2013.01); *B32B 2307/536* (2013.01); *B32B 2307/548* (2013.01); *B32B 2307/714* (2013.01); *B32B 2307/732* (2013.01); *B32B 2597/00* (2013.01)

(58) Field of Classification Search
  CPC ....... B32B 15/095; B32B 27/34; B32B 27/40; B32B 2260/021; B32B 2305/28; B32B 2307/536; B32B 2307/548; B32B 2307/714; B32B 2307/732; B32B 2597/00; F16L 3/00; F16L 3/02; F16L 3/08; F16L 3/10; F16L 3/1066; F16L 3/12; F16L 3/1033
  See application file for complete search history.

(56) References Cited

FOREIGN PATENT DOCUMENTS

| | | |
|---|---|---|
| GB | 2343728 | 5/2000 |
| GB | 2379681 | 3/2003 |
| JP | 2002-28997 | 1/2002 |
| WO | 0216726 | 2/2002 |
| WO | 03025331 | 3/2003 |
| WO | 2006/082595 | 8/2006 |
| WO | 2010035248 | 4/2010 |
| WO | 2013171521 | 11/2013 |
| WO | 2016088007 | 6/2016 |
| WO | 2016201285 | 12/2016 |
| WO | 2018109432 | 6/2018 |

OTHER PUBLICATIONS

GB1813192.0 Combined Search and Examination Report dated Jan. 9, 2019 (2 pages).

PCT/GB2018/052294 International Search Report and Written Opinion of the International Searching Authority dated Jan. 18, 2019 (15 pages).

* cited by examiner

CLAMP HAVING A CORE LAYER OF RIGID POLYURETHANE

CROSS REFERENCE TO RELATED APPLICATIONS

This application is a nationalization of and claims priority to PCT/GB2018/052294, filed on Aug. 13, 2018, which claims priority to GB201712940.4, filed Aug. 11, 2017, the disclosures of each of which are hereby incorporated by reference in their entirety.

This invention relates to a material and more specifically to a material with increased creep resistant performance which finds particular application in the formation of products designed for use in subsea and deepwater operations, more specifically in the oil and gas industry. The invention also relates to a clamp incorporating the aforementioned material and also to a method of forming components of said clamp.

Clamps are typically used in the recovering of hydrocarbons, especially oil and gas from subsea production facilities, for many different purposes. This may be to attach buoyancy modules around a tubular member such as a pipe, riser, flowline or umbilical to add buoyancy to the component and reduce topside or tension loads. The buoyancy module may also assist in achieving particular configurations of tubular member within the surrounding water such as lazy wave, steep wave, lazy or Steep S for example. This allows the operator to securely hold the tubular member in the required configuration. Alternatively, or additionally, clamps may hold supplementary lines such as choke, kill, booster and hydraulic lines for example in position around a tubular member such as a pipe or riser and to prevent buckling of these supplementary lines when the pipe or riser is operational or to retain a module assembly in position on the pipe or flowline.

The clamps described above are typically mounted directly onto the outer layers of the pipe, riser or umbilical. The fluids flowing through these subsea assets are typically produced at very high temperature and pressures despite being surrounded by sea water and so the clamps have to be able to operate securely under very high loads within a particularly harsh environment and to resist the axial movement of large buoyancy and ballast loadings.

Polymer clamps offer significant weight reduction in deep and ultra-deepwater environments and polyurethane is considered to provide a robust, impact resistant material which can be custom designed and moulded to suit specific requirements that a customer may present.

Whilst polymers including polyurethane are particularly useful in forming clamping components for use subsea and particularly useful in the challenging operational conditions noted above, the materials can suffer from creep which is the tendency of a solid material to move slowly or deform permanently under the influence of mechanical stresses. This can occur as a result of long-term exposure to high levels of stress and high levels of temperature that are still below the yield strength of the material. The clamping components typically have to be able to withstands loads of around 1-20 tonnes when they are in use.

The material will undergo deformation during use but as long as the loads are released before creep rupture occurs, an immediate elastic recovery equal to the elastic deformation of the material occurs, followed by a period of slow recovery. In most cases however, the material will not recover to the original shape and a permanent deformation remains. The magnitude of the permanent deformation will depend on the length of time the load is applied, the amount of stress applied to the material and the temperature of the material during use. Over time, the ability of the material to recover close to the original shape will decrease and this can therefore shorten the operational life of components formed from the material.

This is particularly a problem in relation to clamps because any significant deformation of the components of the clamp will inhibit the operation of the clamp and so may lead to failure of the clamp to connect securely around the tubular member that it is applied to which could result for example in loss of the required configuration of pipe, riser or umbilical within the water column or damage to ancillary equipment connected to the tubular member via the clamp.

Therefore, reducing the tendency to creep of a material can increase the performance of the material and also extend the lifetime of the material and particularly components formed of the material which are used in a harsh or severe environment such as experienced in the offshore and subsea oil and gas industries.

Creep may be alleviated by changing the materials from which the clamp components are formed to a material with a significantly higher modulus which exhibits very little creep such as metals or fibre reinforced plastics. However making components from these materials is very expensive and metallic components such as steel would add significant weight to buoyance modules and also requires protection against corrosion from seawater.

Alternatively the size of the clamping components may be increased to seek to reduce the stress within the components to a level at which the tendency for creep is also significantly reduced. However in practice the clamping components would have to be made around 4 to 5 times bigger in order to achieve this reduction in creep and such a size of clamp would be impractical both in terms of transportation and use.

As a further alternative, the operating temperatures within which the materials are used can be reduced in order to control the affects of creep within the material. In a seawater environment, control of the ambient temperature is not possible.

The present invention therefore aims to address and seeks to overcome the problem of creep particularly in association with polymer materials. More particularly, the present invention aims to address and seeks to overcome problems associated with creep in relation to clamping components formed or incorporating polymer components.

The present invention therefore aims to provide a material, and preferably a polyurethane based material which has improved creep resistance properties thereby seeking to extend the life and or capacity of components formed of the material for use in offshore and subsea environments.

Furthermore, it is an aim of the present invention to provide a clamp with improved creep resistant performance, particularly for use subsea where the clamp will experience high temperature and pressure conditions.

It is also an aim of the present invention to provide a method of forming components of a clamping system which can overcome these issues in relation to the creep performance of the materials.

STATEMENTS OF INVENTION

According to one aspect of the present invention there is provided a creep resistant material comprising a core layer of rigid polyurethane with a first tensile reinforcement layer applied on one surface and a second tensile reinforcement layer applied on the other opposed surface of the core layer, the entire respective first and second tensile reinforcement layers being in contact with the respective first and second surfaces of the core layer of the material.

Preferably the entire first and second tensile reinforcement layers are in contact with the entire first and second surfaces of the core layer of the material.

Preferably the core layer further comprises nylon.

Preferably the tensile reinforcement layer has a higher, preferably significantly higher tensile modulus and a higher tensile strength that the core layer of the material.

Due to its significantly higher modulus than the core of the material, the tensile reinforcement layer acts to stiffen the core and reduce flexural stress in the core.

Advantageously the tensile reinforcement layer comprises a fibre-reinforced composite material or a corrosion resistant metal sheet.

Advantageously the tensile reinforcement layer includes woven or non-woven mat material. Optionally the mat material is a triaxial, biaxial or axial matting. Optionally the mat may be woven or stitched.

Conveniently each tensile reinforcement layer may comprise two or more layers of material laminated together and/or onto the core.

Optionally the laminated mat material is polymer-impregnated.

Preferably the fibre weight in the mat material is biased in one direction.

Preferably the mat is made from fibres of any of glass, carbon, aramid, Dyneema® or a combination thereof.

Conveniently the reinforcement layer is bonded to the core of the material.

Advantageously the tensile reinforcement layers are around 3-20 mm thick and may preferably be around 5 mm thick.

Preferably the core of the material comprises a rigid polyurethane with a hardness of greater than 60 shore D.

In some embodiments the core of the material comprises a rigid nylon with a hardness of greater than 60 shore D.

Preferably the core of the material is sandwiched between tensile reinforcement layers.

According to a further aspect of the present invention there is provided a clamp for mounting around a tubular member such as a pipe, riser, umbilical, shaft or mandrel, said clamp comprising one or more segments adapted to surround the tubular member, each segment incorporating material according to the first aspect of the invention.

Advantageously the clamp segments comprise first and second arcuate sections which are spaced from one another by one or more spars.

Conveniently the one or more spars are provided at the ends of the arcuate sections.

Preferably the material according to the first aspect of the invention extends between the arcuate sections of the clamp segments.

Advantageously the arcuate sections of the clamp comprise polyurethane. In one embodiment the clamp has three segments which together surround the tubular member.

Preferably fixing means are provided on the clamp segments to enable connection between adjacent clamp segments.

Conveniently each clamp segment comprises a region of enlarged thickness at each end of the segment.

Preferably the regions of enlarged thickness form a shoulder at the ends of the segments.

Advantageously the fixing means connect the regions of enlarged thickness of adjacent clamp segments.

Preferably apertures are provided through the region of enlarged thickness of the clamp segments.

Preferably the fixing means comprise metal spars that rest upon the shoulders at the ends of the segments.

Advantageously the fixing means further comprises a metal tie bar that passes through the spar of one clamp segment, through the aperture in the area of enlarged thickness and through the aperture of an adjacent clamp segment and through the spar of the adjacent clamp segment and a bolt or nut to hold the tie bar in a loaded condition.

Preferably the clamp further comprises one or more clamping elements mounted on an internal surface of each clamp segment.

Advantageously the clamping elements are mounted to the reinforcement layer of the clamp segments.

Conveniently each segment comprises three clamping elements. Furthermore, each clamping element may be secured by fixings including screws, nuts or bolts into the reinforcement layer.

Preferably the clamping elements comprise a resilient material. More preferably they may comprise rubber.

According to a still further aspect of the invention there is provided a method of forming components of a clamp according to the second aspect of the invention comprising the steps of providing a trough mould shaped to form multiple segments of clamps, partly filling the mould with a polymer material and allowing the polymer material to cure in the mould, removing the cured polymer material from the mould and cutting through the individual segments to separate segments and applying a tensile reinforcement layer to each side to the polymer material segments.

Advantageously the reinforcement material is draped over or pumped into the mould to coat the inner surfaces of the mould before the polymer material is added to the mould.

Advantageously the polymer material is pumped into the mould onto the reinforcement covered inner surface of the mould.

Conveniently the individual segments of the mould are separated by machine cutting through the moulded component at spaced intervals.

Preferably an aperture is cut into the ends of each clamp segment.

Embodiments of the present invention will now be described with reference to the attached drawings in which.

Figure 1:
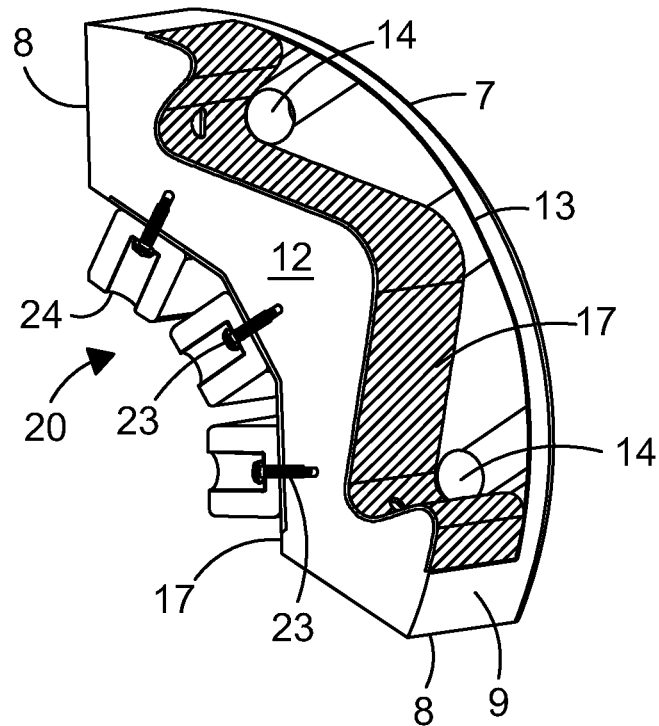
FIG. 1 is a cut away perspective view of a clamp segment incorporating a material according to the first aspect of the present invention.

Turning now to the drawings, FIG. 1 illustrates a first embodiment of a clamp 1 adapted for mounting on a tubular member 2 such as a pipe, riser, umbilical, mandrel or other such element comprising a creep-resistant material according to the present invention.

The clamp 1 is formed of a plurality of substantially arcuate segments 3. In the illustrated embodiment there are three segments which can be secured together to completely encircle a tubular member although in other embodiments there may be more or fewer segments.

In this embodiment each segment 3 comprises first and second arcuate plates 4,5. The plates are substantially flat with inner and outer opposed curved edges 6,7. The side edges 8 of each of the first and second plates are straight. This allows the edges of adjacent segments to sit close together when a number of segments are mounted around a tubular member 2.

In the illustrated embodiment vertical spars 9 extend between the straight side edges 8 of the first and second plates. An aperture 10 is provided in the centre of each vertical spar as will be described further below. The arcuate plates 4,5 and vertical spars 9 are formed of polyurethane.

Figure 2:
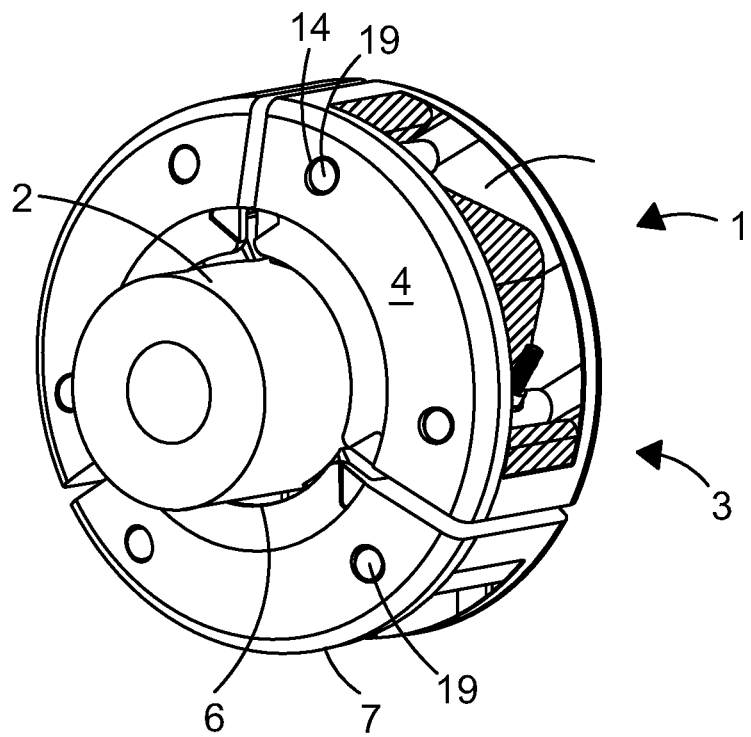
FIG. 2 is a perspective view of a clamp according to the second aspect of the present invention formed of three clamp segments.

FIG. 2 is a cut away perspective view in which the first arcuate plate 4 is removed to show the internal detail of the clamp segment 3. A reinforcement member 11 is provided within the segment between the first and second arcuate plates and extending across the plates between the side edges 8. The reinforcement member comprises a polymer core 12 which extends between the vertical spars. The core is preferably comprises a rigid polymer material such as for example polyurethane or nylon. The core may be formed of a combination of polymer materials such as rigid polyurethane and nylon.

In the illustrated embodiment, the core comprises a rigid polyurethane with a hardness of greater than 60 shore D and the polyurethane core is recessed from the outer curved edge of the segment. Where the core comprises nylon, this would have a similar hardness to the polyurethane material noted above. The recess is greatest towards the vertical spars 9 of the segment and reduces to a point mid way between the spars, although in this embodiment, at this mid way point 13, the core is still recessed from the outer curved edge of the segment.

Apertures 14 are provided in the first and second arcuate plates 4,5. The apertures are aligned and positioned approximate the point of maximum recess of the reinforcement member 11 from the outer curved edge 7 of the plates.

Figure 3:
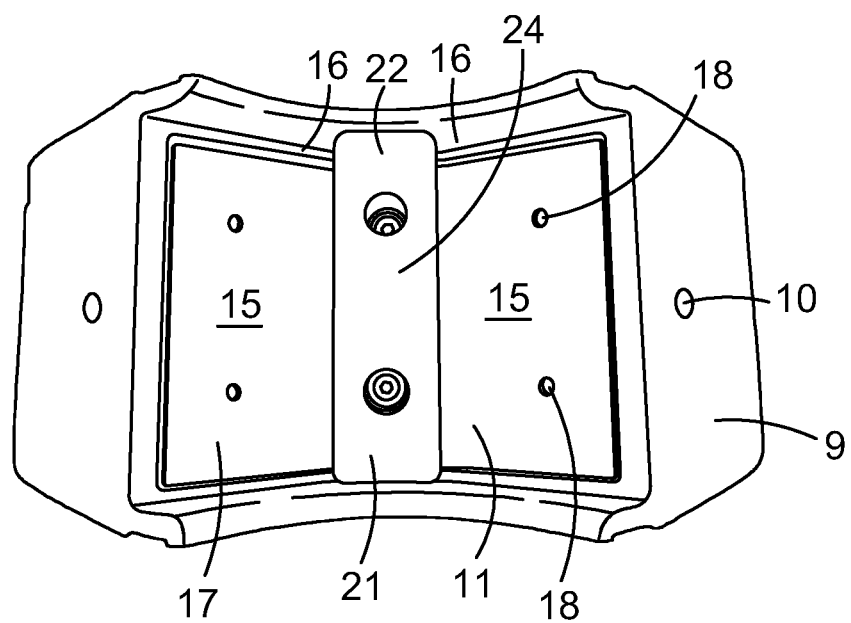
FIG. 3 is a view of the internal surface of a clamp segment with one spacer attached.

Towards the inner curved edge 7 of the plates, the polyurethane core 12 is formed into three straight edged portions 15 connected together through angled regions 16. The polyurethane core of the segment is recessed from the inner curved edges of the first and second plates as shown in FIG. 3 such that the arcuate plates overhang the inner polyurethane core.

The reinforcement member further comprises a tensile reinforcement layer 17 applied to each side of the polyurethane core proximate the inner and outer curved edges 6,7 of the plates. The entire tensile reinforcement layer 17 on each side is in contact with the core of the material. Thus there are no other materials or structural elements between the surface of the core and the tensile reinforcement layers 17. In preferred embodiments, the entire surface area of both sides of the core is covered by respective layers of the tensile reinforcement material. In other words, the tensile reinforcement material layer is no smaller than the surface of the core of the material and has the same shape and dimensions as the surfaces of the core upon which they are applied.

The tensile reinforcement layer is made of any high tensile strength, high tensile modulus material, for example but not limited to, fibre-reinforced epoxy composites or corrosion resistant metal sheet. Epoxy composites are preferred to maximise inter-material bond strength.

Triaxial unwoven/stitched matt with typical values of 0 degrees/45 degrees/45 degrees and 600/300/300 gm/m$^2$ weight is also suitable. Triaxial, biaxial or uniaxial, woven or non-woven mats can also be used in the tensile reinforcement layer, preferably with the fibre reinforcement of the composite being at least equal, and preferably significantly greater, bias in weight and/or strength in the axial direction of the riser after installation. Preferably, two layers of triaxial unwoven/stitched mat, 0 degrees/45 degrees/45 degrees, 600/300/300 gm/m$^2$ are used, with the major reinforcement in the 0 degree direction in both mattings being aligned in the axial direction.

Suitable matting materials are glass, carbon, aramid, Dyneema® or any other high strength, high modulus fibre or any combination of these. Where glass matting is used as the reinforcement layer, the total matting reinforcement weight should exceed 450 gm/m$^2$ and may be as high as 7200 mg/m$^2$. Other fibre matting weights should be used in quantities which are proportional to their tensile properties.

Preferably, the tensile reinforcement layer is laminated, the lamination being directional in its reinforcement properties. Preferably the bias of the lamination is towards axial alignment, i.e. in the direction of the riser and parallel to the clamp leading edge. Optionally, the tensile reinforcement layer may be pre-manufactured and be bonded onto the polyurethane core, rather than being created in situ by lamination.

The laminated material may include a resin, e.g. a polymer resin or epoxy resin. The laminated material may include polymer impregnated mat material, e.g. polymer-impregnated woven mat material. Other laminating or impregnating resins may be used with the tensile reinforcement layer of the invention, for example but not limited to, unsaturated polyester, vinyl ester or phenolic thermoset and/or thermoplastic resins. The type of resin to be used will vary depending on the nature of the clamp body onto which lamination occurs and the availability of suitable adhesives for bonding of pre-made laminates.

The tensile reinforcement layer is applied in a thin layer onto the polyurethane core. The tensile reinforcement layer may be around 3 mm to 20 mm thick but preferably may be around 5 mm thick. The thickness of reinforcement is tailored to balance the bending loads and required stiffness's of the specific clamp. The polyurethane thickness will entirely depend on geometry constraints, bearing area requirements of buoyancy, and stepping out the outer diameter of the outer tensile reinforcement layer which in turn improves sectional modulus, thus increasing performance.

The layer may be bonded onto the polyurethane core 12.

Alternatively the polyurethane core may be prepared and the tensile reinforcement layers laid on each side and held in position once the clamp is mounted on a tubular member as described further below.

Apertures 18 are provided in the tensile reinforcement layer on the side adjacent the inner curved edges 6 of the first and second arcuate plates. A pair of apertures is provided in each of the three straight sections 15 of the tensile reinforcement layer one adjacent the first arcuate plate and the other adjacent the second arcuate plate.

Elongate metal rods 19 are mounted through the corresponding apertures in the arcuate plates as will be described further below. The length of the metal rods is such that the end of each rod sits just below or level with the surface of the first and second plates 4,5.

A plurality of clamping members 20 are mounted adjacent the inner curved edge 6 of the segments. In the illustrated embodiment three clamping members 20 are provided, each one fixed to one of the straight edged portions 15 of the reinforcement member. The clamping members ensure a tight fit between the outer surface of the tubular member and the inner surface of the clamping segments.

Each clamping member comprises a substantially rectangular block 21 of a resilient material such as rubber. Suitable materials for the rubber are those which not only have low stress relaxation rates, high resistance to seawater and high heat resistance but those that result in liquid like behaviour under load, that is virtually no volume change under load (a Poison's ratio near to 0.5). Most grades of natural rubber have a value in excess of 0.49995. They also have very high resilience—when the load on it is reduced the rubber recovers rapidly. If this did not occur, slip could be possible when the riser contracts. Preferably the rubber is natural rubber such as Engineering Vulcanzate™.

As shown most clearly in FIG. 3, the clamping members have apertures 22 which enable fixing members such as screws or bolts 23 to pass through the clamping members and into the apertures in the reinforcement member 11 to fix them securely in position on the inner face of the reinforcement member. The outer surface of the clamping members 24 may be shaped to conform to the outer surface of the tubular member and to account for any irregularities in the outer surface of the tubular member 2. The clamping members extend substantially between the overhang of the arcuate plates of the clamp segments.

In use three clamp segments are positioned around a tubular member 2 with the clamping members 20 adjacent the inner curved edges 6 of the arcuate plates abutting the outer surface of the tubular member.

Standard bolted fasteners are then passed through the apertures in the sides of the clamping components to connect the metal rods and hold the segments together.

Figure 4:
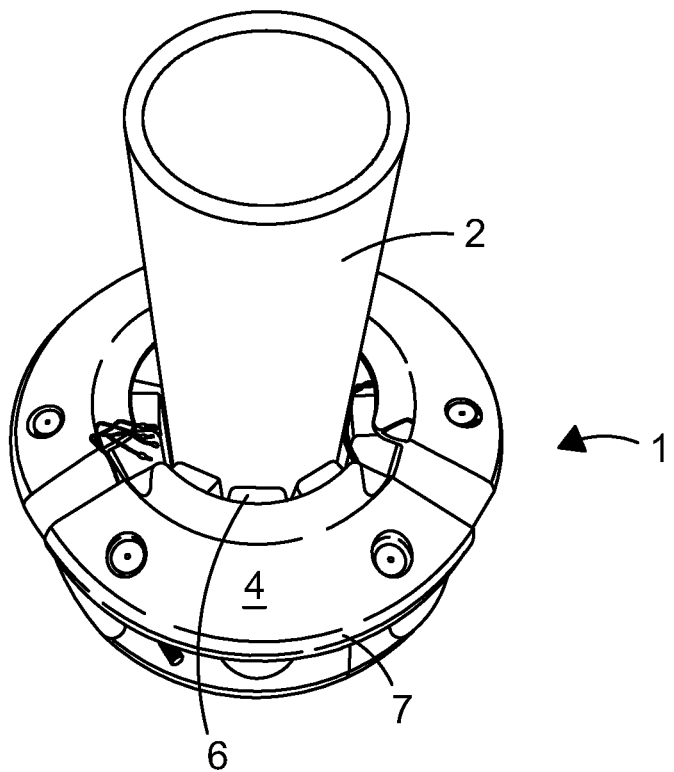
FIG. 4 is a perspective view of a clamp according to FIG. 2 mounted on a pipe.

As shown in FIG. 4, the edges of adjacent segments 3 are drawn closely together and held firmly in position to hold the clamping members 20 firmly against the outer surface of the tubular member. The clamping members act as rubber springs around the tubular member. In this position, the outer layer 17 of the reinforcement member 11, proximate the outer curved edge of the plates 7 is held in tension while the inner surface of the reinforcement member, proximate the inner curved edge 6 of the first and second plates is held under compression.

By supporting each side of the polyurethane core 12 of the clamping components with the tensile reinforcement layer, the polyurethane core is effectively sandwiched between the tensile reinforcement layers over the entire surface thereby ensuring that whilst the polyurethane core can still bend and flex independently of the reinforcement layer, loads experienced by both bend on outer and inner surfaces of the clamp are constrained thus stiffening the core which in turn reduces the flexural stress in the core and thereby reduces creep within the polyurethane core.

This provides for an improvement in creep resistance of the clamping components without having to increase the size of the clamping components and thus the size of the clamp.

Figure 5:
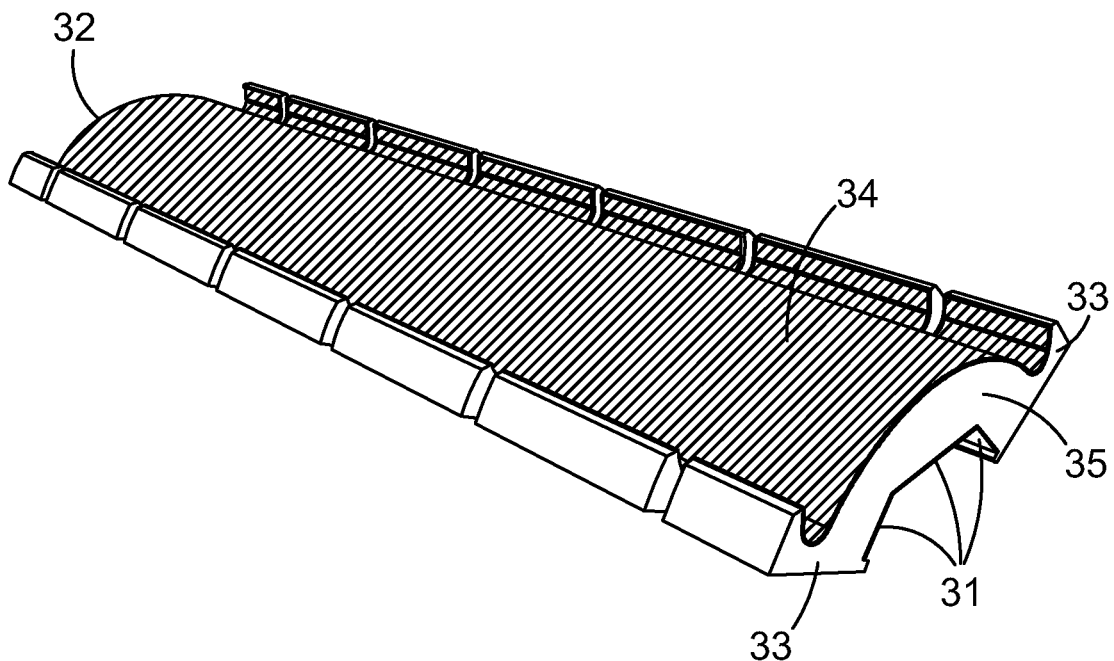
FIG. 5 is a schematic view of a moulded body forming segments of a clamp according to a further embodiment of the present invention.
Figure 6:
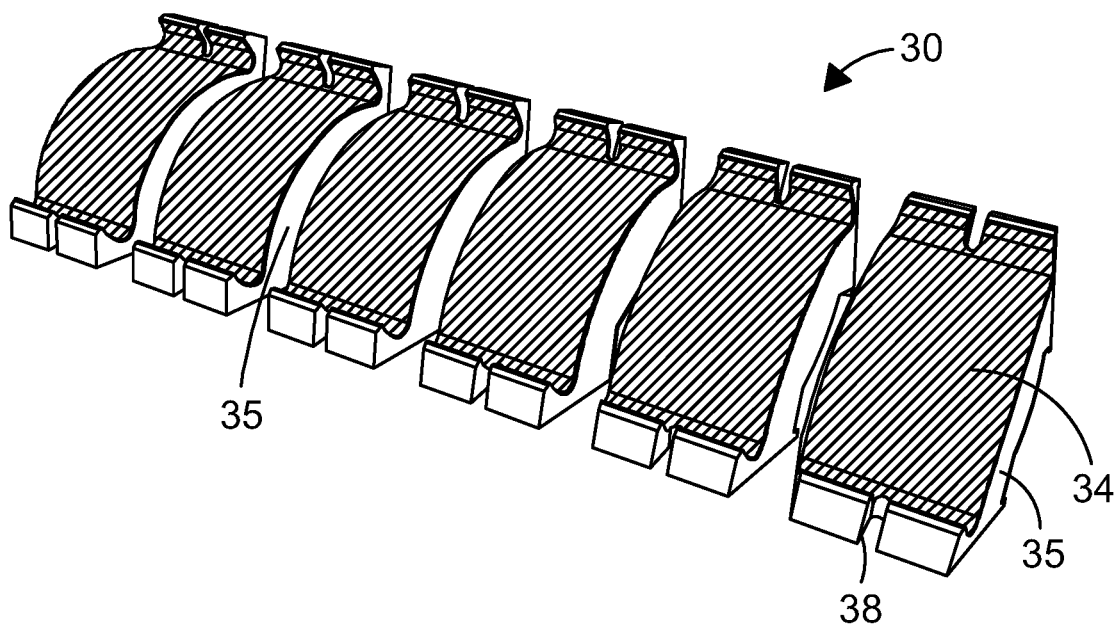
FIG. 6 is a schematic view of the moulded body of FIG. 5 cut into individual clamp segments.
Figure 7:
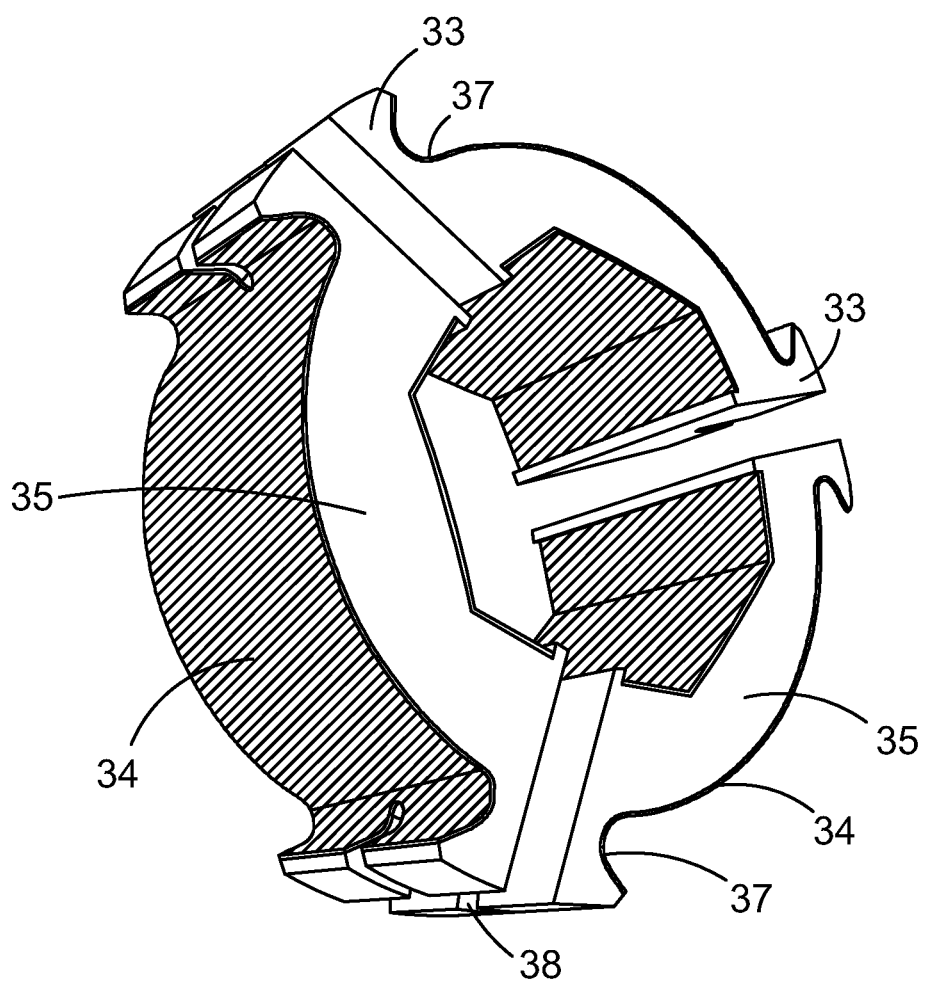
FIG. 7 is a schematic view of a clamp formed of 3 clamp segments of FIG. 6.

A second embodiment of clamp components according to the invention is shown in FIGS. 5-7. In this embodiment, a plurality of clamp segments 30 is formed together in a moulding process. A trough mould (not shown) is prepared in which the bottom of the mould will form the inner edge of the clamp components corresponding to the inner arcuate edge of the segments of the first embodiment. The bottom of the mould has a raised central portion with tapered side edges. This will form the three straight edged sections 31 of the inner surface of the clamp segments.

The upper part of the trough is shaped to ensure that the outer edge 32 of each segment is substantially arcuate and to provide regions of increased thickness 33 at each end of the each clamp section.

A coating of tensile reinforcement material 34 such as that described above in relation to the first embodiment is applied to the bottom of the mould. The tensile reinforcement layer may be draped or pumped into the mould. The thickness of the material may be around 3-20 mm.

Polyurethane 35 or nylon as described above is then pumped into the mould to cover the tensile reinforcement layer and to substantially fill the mould. A further tensile reinforcement layer is then applied over the polyurethane in the mould. The polyurethane is then allowed to cure in the mould and is effectively sandwiched between the tensile reinforcement layers.

The moulded strip is then removed from the mould after typically 15-45 mins and allowed to cool naturally for around 24-48 hours and as shown in FIG. 5 and machine cut into individual clamp segments as shown in FIG. 6. The edges cut into the strip will form the upper and lower edges of a clamping segment when the clamp is assembled.

Alternatively, the mould may be used to shape the polyurethane core of the segments and the tensile reinforcement layer may be separately prepared and cut to size and applied over each side of the separated segments and either bonded to the polyurethane core or allowed to float freely on the sides of the polyurethane core. As described above, the entire reinforcement layer is in direct contact with the entire opposed surfaces of the core of the material.

As shown in FIGS. 5 and 6, each clamp segment comprises a substantially arcuate body formed of a core of polyurethane with inner and outer layers of glass fibre or carbon fibre polymer material. In use the inner layer will be proximate the outer surface of a tubular element 2 and the outer layer will be remote from the tubular element.

The clamping segments have a region of increased thickness 33 at the ends of the component and a recess 37 on the outer surface just behind this increased thickness region. A slot 38 is cut into the region of increased thickness at each end of the clamp segments. In this embodiment the first and second arcuate plates of the first embodiment are integrally formed with the reinforced body of the clamp segments. This provides a weight saving to the clamping segments but also reductions in manufacturing time and material costs.

In use of this embodiment, three clamp segments are prepared from the moulded strip of segments. A slot 38 is formed in the region of increased thickness 33 at each end of the segments and clamping components are mounted on the inner surface of the clamp members. As with the first embodiment, three clamping components 20 are mounted on the inner surface of the clamp segment, one component being provided on each of the three straight edged sections of the clamping segment. The clamping component may be as described in the first embodiment and may be mounted to the inner edge of the clamping segment via suitable fixing means (not shown).

A metal bar (not shown) is placed into the recess behind the region of increased thickness at the ends of the clamping segments. The metal bar has a length equivalent or slightly less than the height of a clamping segment. A tie bar (not shown), a bolt or a threaded bar is passed through the metal bar and through the slots to connect the metal bars of two adjacent clamping segments together.

As with the first embodiment, the reinforcement layer provided by the glass fibre polymer or carbon fibre polymer provides the polyurethane core with improved creep resistance characteristics. This means that a load can be applied to the clamp segments when they surround a tubular element to securely hold the clamp in position on the tubular element and the rate of deformation of the polyurethane over time will be reduced such that the anticipated life of the clamp components formed of such a material can be increased. Additionally the clamp components may be designed to accommodate large axial loads which allows for larger buoyancy modules to be made. This provides a significant advantage particularly for clamp components for use in the harsh environmental conditions in the of shore and subsea oil and gas industry where the components are subject to extreme operating pressures and temperatures.

It will be appreciated by a skilled person that moulding of clamp segments as described with reference to the second embodiment is less time consuming than forming clamp segments with an internal reinforced core and therefore more efficient to manufacture which leads to time and cost savings. In the embodiment described above where the reinforced inner and outer layers are formed directly with the polyurethane internal core, the cost of moulding and machining the core is reduced and thus provides efficiency savings. Furthermore, as a plurality of clamp segments are formed in a single moulding operation, this limits any material differences between adjacent clamp components which provides for further improvements in efficiency and reliability.

In the description several examples of tubular members have been given and the skilled person would understand that there are many other components which this term covers including for example jumpers and steel catenary risers.

What is claimed is:

1. A clamp for mounting around a tubular member, said clamp comprising one or more segments adapted to surround the tubular member, each segment incorporating a creep resistant material, the creep resistant material comprising a core layer of rigid polyurethane with a first tensile reinforcement layer applied on one surface and a second tensile reinforcement layer applied on an opposed second surface of the core layer, the entire respective first and second tensile reinforcement layers being in contact with the respective first and second surfaces of the core layer of the material.

2. A clamp according to claim 1, wherein the core layer further comprises nylon.

3. A clamp according to claim 1, wherein the tensile reinforcement layers have a higher tensile modulus and a higher tensile strength that the core layer of the material.

4. A clamp according to claim 1, wherein the tensile reinforcement layers comprises a fibre-reinforced composite material or a corrosion resistant metal sheet.

5. A clamp according to claim 3, wherein the tensile reinforcement layers include woven or non-woven mat material.

6. A clamp according to claim 5, wherein the mat material is a triaxial, biaxial or axial matting.

7. A clamp according to claim 1, wherein each tensile reinforcement layer comprises two or more layers of material laminated together and/or onto the core layer.

8. A clamp according to claim 1, wherein the reinforcement layers are bonded to the core layer of the material.

9. A clamp according to claim 1, wherein the tensile reinforcement layers are around about 3-20 mm thick.

10. A clamp according to claim 1, wherein the core layer of the material comprises a rigid polyurethane with a hardness of greater than 60 shore D.

11. A clamp according to claim 1, wherein the clamp segments comprise first and second arcuate sections which are spaced from one another by one or more spars.

12. A clamp according to claim 11, wherein the creep resistant material extends between the arcuate sections of the clamp segments.

13. A clamp according to claim 11, wherein the arcuate sections of the clamp comprise polyurethane.

14. A clamp according to claim 1, further comprising fixing means provided on the clamp segments to enable connection between adjacent clamp segments.

15. A clamp according to claim 1, wherein each clamp segment comprises a region of enlarged thickness at each end of the segment, wherein the regions of enlarged thickness form a shoulder at the ends of the segments.

16. A clamp according to claim 15, further comprising fixing means provided on the clamp segments to enable connection between adjacent clamp segments, wherein the fixing means connect the regions of enlarged thickness of adjacent clamp segments.

17. A clamp according to claim 1, wherein the clamp further comprises one or more clamping elements mounted on an internal surface of each clamp segment, wherein the clamping elements comprise a resilient material.

18. A clamp according to claim 17, wherein the clamping elements are mounted to the reinforcement layer of the clamp segments.

19. A method of forming components of a clamp for mounting around a tubular member, the method comprising steps of:
   providing a trough mould shaped to form multiple segments of the clamp,
   partly filling the mould with a polyurethane and allowing the polyurethane to cure in the mould to form a cured rigid polyurethane material,
   removing the cured rigid polyurethane material from the mould and cutting through individual segments to form separate polyurethane segments, and
   applying a first tensile reinforcement layer to a first surface of each of the polyurethane segments and applying a second tensile reinforcement layer to a second surface of each of the polyurethane segments.

20. A method of forming components of a clamp according to claim 19, wherein the reinforcement material is draped over or pumped into the mould to coat the inner surfaces of the mould before the polyurethane is added to the mould.

21. A method of forming components of a clamp according to claim 20, wherein the polyurethane is pumped into the mould onto the reinforcement covered inner surface of the mould.

22. A method of forming components of a clamp according to claim 19, further comprising the step of separating the individual moulded segments of the clamp by machine cutting through the moulded component at spaced intervals.

* * * * *